United States Patent
Hisamura

(10) Patent No.: US 12,291,272 B2
(45) Date of Patent: May 6, 2025

(54) OFF-ROAD VEHICLE

(71) Applicant: KAWASAKI MOTORS, LTD., Hyogo (JP)

(72) Inventor: Takashi Hisamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/354,699

(22) Filed: Jul. 19, 2023

(65) Prior Publication Data

US 2025/0026410 A1   Jan. 23, 2025

(51) Int. Cl.
  *B62D 23/00* (2006.01)
  *B60R 21/13* (2006.01)
  *B62D 21/18* (2006.01)
  *B62D 65/02* (2006.01)

(52) U.S. Cl.
  CPC ............ *B62D 23/005* (2013.01); *B60R 21/13* (2013.01); *B62D 21/183* (2013.01); *B60R 2021/137* (2013.01); *B62D 65/024* (2013.01)

(58) Field of Classification Search
  CPC .. B62D 23/005; B62D 21/183; B62D 65/024; B60R 21/13; B60R 2021/137
  See application file for complete search history.

(56) References Cited

U.S. PATENT DOCUMENTS

| | | | | |
|---|---|---|---|---|
| 8,499,882 | B2 * | 8/2013 | Tsumiyama | B60K 5/02 280/798 |
| 10,279,853 | B2 | 5/2019 | Filion et al. | |
| 11,685,296 | B2 * | 6/2023 | Nowland | B60N 2/3022 296/64 |
| 2009/0184531 | A1 * | 7/2009 | Yamamura | B62D 33/02 296/65.01 |
| 2014/0034409 | A1 * | 2/2014 | Nakamura | B62D 21/183 180/291 |
| 2014/0117653 | A1 * | 5/2014 | Deschambault | B60R 21/13 296/100.18 |
| 2014/0225357 | A1 * | 8/2014 | Shinbori | B60R 21/13 280/771 |
| 2016/0096478 | A1 * | 4/2016 | Reynolds | B60N 2/01 296/25 |
| 2019/0232910 | A1 * | 8/2019 | Hisamura | B62D 27/065 |
| 2021/0101469 | A1 * | 4/2021 | Ishibashi | B60K 11/04 |
| 2021/0129921 | A1 * | 5/2021 | Rasa | B62D 27/023 |
| 2024/0100941 | A1 * | 3/2024 | Schlangen | B60K 17/34 |

FOREIGN PATENT DOCUMENTS

GB   2306408 A  * 5/1997 ............. B60R 21/13
WO  WO-2023211528 A1 * 11/2023 ............. B60G 7/001

* cited by examiner

*Primary Examiner* — Drew J Brown
(74) *Attorney, Agent, or Firm* — Studebaker Brackett PLLC

(57) ABSTRACT

An off-road vehicle includes a vehicle body frame 1 and a ROPS 2 coupled to the vehicle body frame 1. The ROPS 2 has a front-rear frame 3 extending substantially in a front-rear direction, a vehicle width frame 4 extending substantially in a vehicle width direction, and brackets 6 coupling the front-rear frame 3 and the vehicle width frame 4 to each other.

9 Claims, 6 Drawing Sheets

OFF-ROAD VEHICLE

FIELD

The technique disclosed herein relates to an off-road vehicle.

BACKGROUND

U.S. Pat. No. 10,279,853 discloses an off-road vehicle. The off-road vehicle has a roll-over protection structure (ROPS) located in an upper portion of the vehicle.

SUMMARY

The ROPS protects an occupant, for example, when the vehicle rolls over. For this reason, a high stiffness is required for the ROPS so that the ROPS can withstand impact from the outside.

The technique disclosed herein has been made in view of the above-described point, and an object thereof is to enhance the stiffness of the ROPS.

The off-road vehicle disclosed herein includes a vehicle body frame and a ROPS coupled to the vehicle body frame. The ROPS has a front-rear frame extending substantially in a front-rear direction, a vehicle width frame extending substantially in a vehicle width direction, and a bracket coupling the front-rear frame and the vehicle width frame to each other.

The off-road vehicle is configured so that the stiffness of the ROPS can be enhanced.

DESCRIPTION OF EMBODIMENTS

Figure 1:
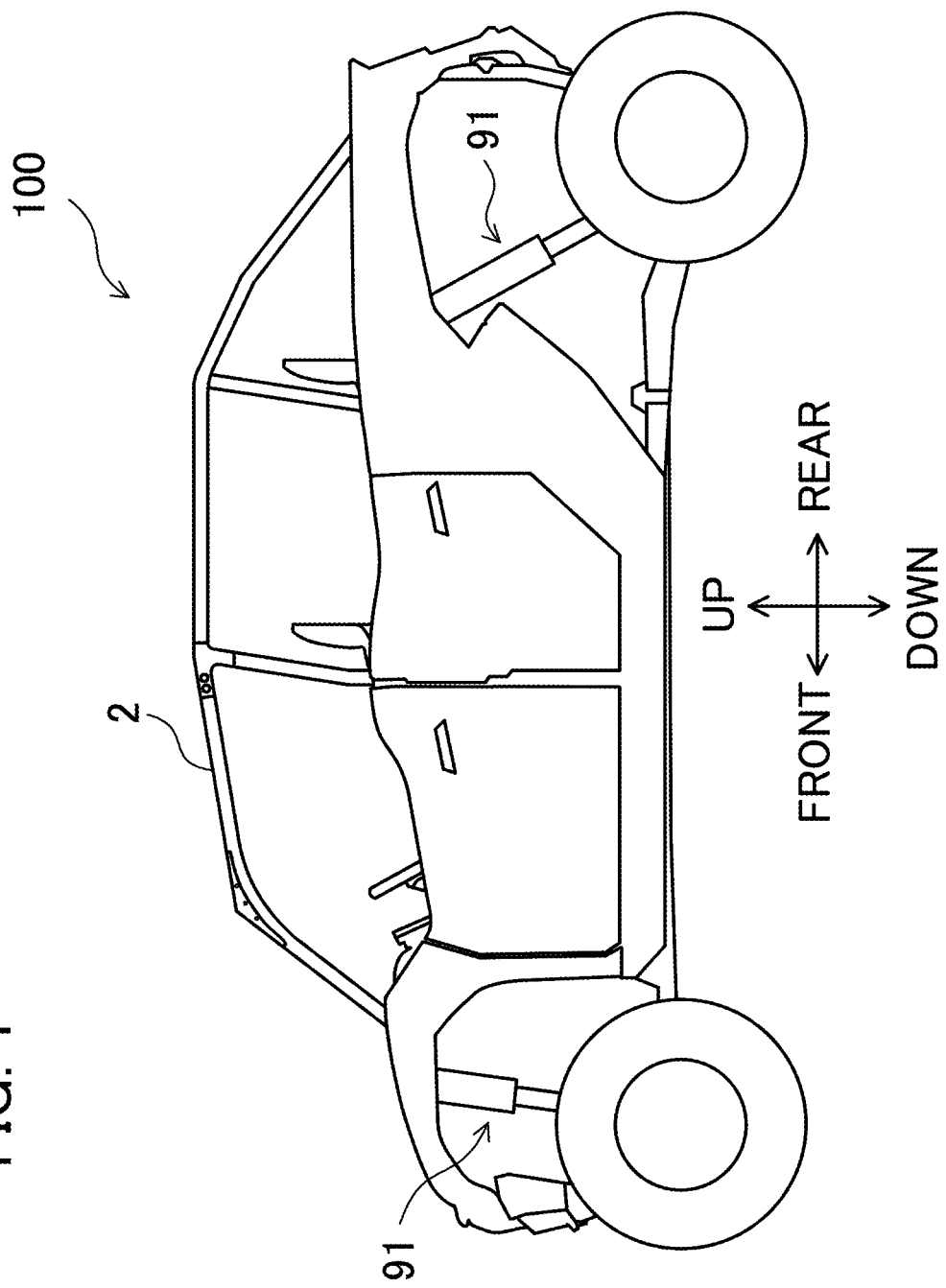
FIG. 1 is a left side view of a utility vehicle.

Hereinafter, an exemplary embodiment will be described based on the drawings. FIG. 1 is a side view of a utility vehicle 100. For the sake of convenience in description, members other than shock absorbers 91 among members inside the utility vehicle 100 are not shown in FIG. 1. The utility vehicle 100 is a four-wheeled vehicle that can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction."

Figure 2:
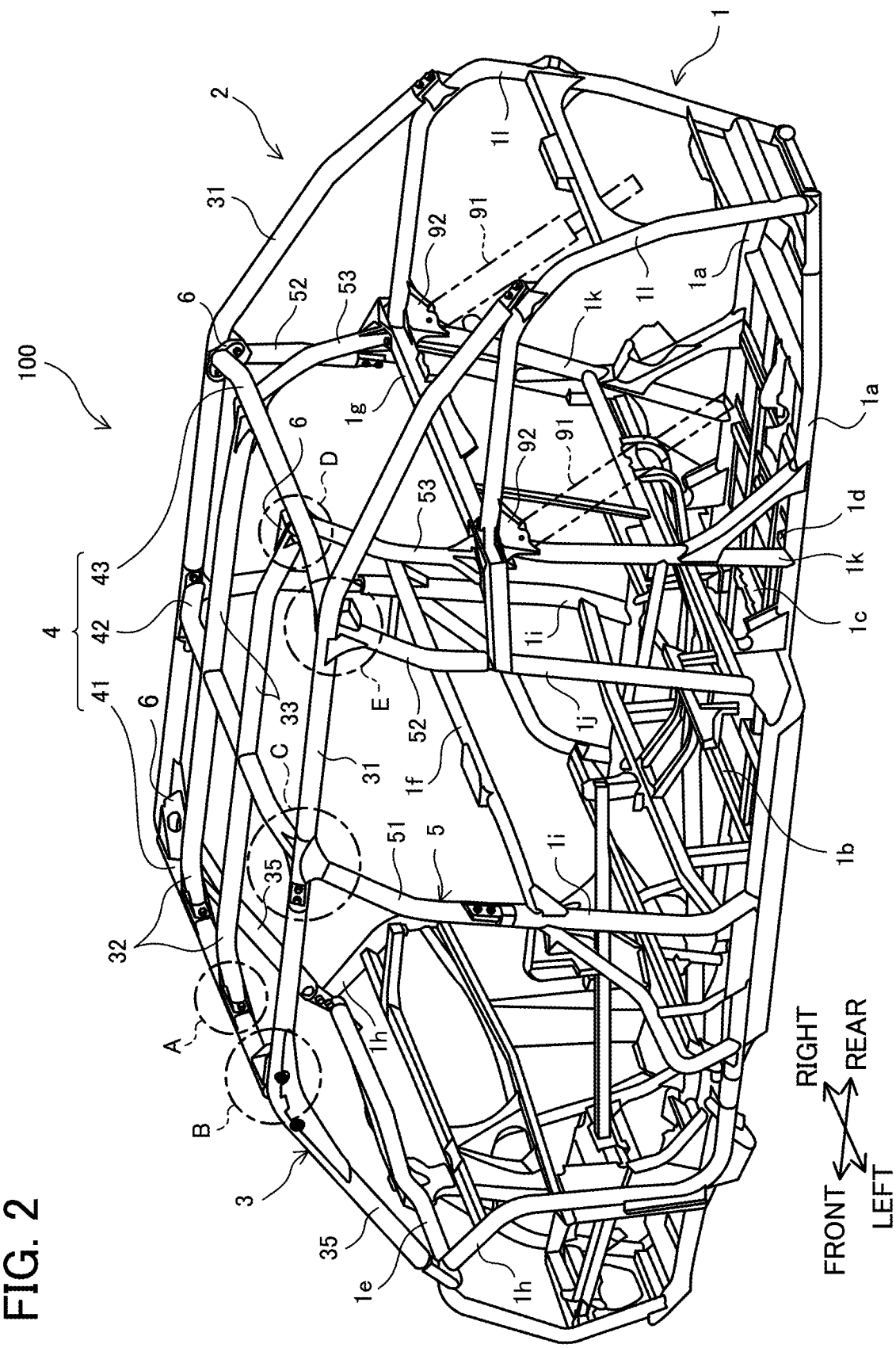
FIG. 2 is a perspective view of a vehicle body frame and a ROPS diagonally from the upper left.

FIG. 2 is a perspective view of a vehicle body frame 1 and a ROPS 2 of the vehicle 100 diagonally from the upper left. The vehicle 100 includes the vehicle body frame 1 and the ROPS 2 (i.e., roll cage) coupled to the vehicle body frame 1. The ROPS 2 is located above the vehicle body frame 1. As shown in FIG. 1, the vehicle 100 may further include the shock absorbers 91. Note that for the sake of convenience in description, members other than the vehicle body frame 1, the ROPS 2, and the shock absorbers 91 are not shown in FIG. 2 and the shock absorbers 91 are indicated by chain double-dashed lines. The same also applies to FIG. 3. The vehicle body frame 1 and the ROPS 2 are substantially bilaterally symmetrical.

The vehicle body frame 1 is a frame which is a basic framework of the vehicle 100. The vehicle body frame 1 is made of metal. The vehicle body frame 1 includes frames. In the present disclosure, a frame extending substantially in the front-rear direction will be referred to as a "side frame," a frame extending substantially in the vehicle width direction will be referred to as a "cross frame," and a frame extending substantially in the upper-lower direction will be referred to as a "vertical frame." The vehicle body frame 1 has side frames 1a, a first cross frame 1b, a second cross frame 1c, a third cross frame 1d, a fourth cross frame 1e, a fifth cross frame 1f, a sixth cross frame 1g, first vertical frames 1h, second vertical frames 1i, third vertical frames 1j, fourth vertical frames 1k, and fifth vertical frames 1l.

The vehicle body frame 1 includes the pair of side frames 1a aligned in the vehicle width direction. The side frames 1a are located in a lower portion of the vehicle 100. The side frame 1a extends substantially in the front-rear direction. The side frame 1a extends substantially over the entirety of the vehicle 100 in the front-rear direction.

The vehicle body frame 1 includes the pair of right and left first vertical frames 1h, the pair of right and left second vertical frames 1i, the pair of right and left third vertical frames 1j, the pair of right and left fourth vertical frames 1k, and the pair of right and left fifth vertical frames 1l. The first vertical frames 1h, the second vertical frames 1i, the third vertical frames 1j, the fourth vertical frames 1k, and the fifth vertical frames 1l extend substantially in the upper-lower direction. The lower ends of the left first vertical frame 1h, the left second vertical frame 1i, the left third vertical frame 1j, the left fourth vertical frame 1k, and the left fifth vertical frame 1l are coupled to the left side frame 1a. The lower ends of the right first vertical frame 1h, the right second vertical frame 1i, the right third vertical frame 1j, the right fourth vertical frame 1k, and the right fifth vertical frame 1l are coupled to the right side frame 1a. The first vertical frame 1h, the second vertical frame 1i, the third vertical frame 1j, the fourth vertical frame 1k, and the fifth vertical frame 1l are located in this order from the front to the rear. In this example, in terms of a position in the front-rear direction, the first vertical frames 1h are located at the front with respect to a driver seat, the second vertical frames 1i are located between the driver seat and a rear seat, the third vertical frames 1j are located at a portion at the rear of the rear seat, and the fourth vertical frames 1k and the fifth vertical frames 1l are located at the rear with respect to the rear seat.

The first cross frame 1b, the second cross frame 1c, and the third cross frame 1d are located in a lower portion of the vehicle 100. Each of the first cross frame 1b, the second cross frame 1c, and the third cross frame 1d extends substantially in the vehicle width direction. The first cross frame 1b is located substantially at the center of the vehicle 100 in the front-rear direction. In this example, the first cross frame 1b passes between the driver seat and the rear seat as viewed in the upper-lower direction. The left end of the first cross frame 1b is coupled to a coupling portion between the left second vertical frame 1i and the side frame 1a, and the right end of the first cross frame 1b is coupled to a coupling portion between the right second vertical frame 1i and the side frame 1a. The second cross frame 1c is located at the rear with respect to the center of the vehicle 100 in the front-rear direction. In this example, the second cross frame 1c passes a portion at the rear of the rear seat as viewed in the upper-lower direction. The left end of the second cross frame 1c is coupled to a coupling portion between the left third vertical frame 1j and the side frame 1a, and the right end of the second cross frame 1c is coupled to a coupling portion between the right third vertical frame 1j and the side frame 1a. The third cross frame 1d is located at the rear with respect to the second cross frame 1c. In this example, the third cross frame 1d passes a portion at the rear with respect to the rear seat as viewed in the upper-lower direction. The left end of the third cross frame 1d is coupled to a coupling portion between the left fourth vertical frame 1k and the side frame 1a, and the right end of the third cross frame 1d is coupled to a coupling portion between the right fourth vertical frame 1k and the side frame 1a.

The fourth cross frame 1e, the fifth cross frame 1f, and the sixth cross frame 1g are located in an upper portion of the vehicle 100. Each of the fourth cross frame 1e, the fifth cross frame 1f, and the sixth cross frame 1g extends substantially in the vehicle width direction. Note that both end portions of the sixth cross frame 1g are inclined forward toward the outside in the vehicle width direction. The fourth cross frame 1e, the fifth cross frame 1f, and the sixth cross frame 1g are located in this order from the front to the rear. In this example, as viewed in the upper-lower direction, the fourth cross frame 1e is located at the front with respect to the driver seat, the fifth cross frame 1f is located between the driver seat and the rear seat, and the sixth cross frame 1g is located at the rear with respect to the rear seat. Both ends of the fourth cross frame 1e are coupled to the upper ends of the right and left first vertical frames 1h. Both ends of the fifth cross frame 1f are coupled to the upper ends of the right and left second vertical frames 1i. Both ends of the sixth cross frame 1g are coupled to the upper ends of the right and left third vertical frames 1j. The sixth cross frame 1g is further coupled to the upper ends of the fourth vertical frames 1k. Specifically, the fourth vertical frames 1k are coupled to inner portions of the sixth cross frame 1g in the vehicle width direction with respect to the portions coupled to the third vertical frames 1j. The sixth cross frame 1g supports the shock absorbers 91. Specifically, the upper ends of the shock absorbers 91 are coupled to the sixth cross frame 1g through coupling tools 92.

The ROPS 2 protects an occupant, for example, when the vehicle 100 rolls over. The ROPS 2 is a frame structure of the vehicle 100 located above the vehicle body frame 1. The ROPS 2 is detachably coupled to the vehicle body frame 1. The shape of the ROPS 2 is a curved shape entirely covering a vehicle cabin. Frames of the ROPS 2 are, for example, metal pipes.

The ROPS 2 has a front-rear frame 3, a vehicle width frame 4, and brackets 6 coupling the front-rear frame 3 and the vehicle width frame 4 to each other. The ROPS 2 may further have an upper-lower frame 5. The front-rear frame 3 extends substantially in the front-rear direction. The vehicle width frame 4 extends substantially in the vehicle width direction. The upper-lower frame 5 extends substantially in the upper-lower direction. The bracket 6 is, for example, a metal coupling tool. The bracket 6 is fixed to at least one of the front-rear frame 3 or the vehicle width frame 4 by, e.g., welding. The front-rear frame 3 and the vehicle width frame 4 are fastened to each other through the brackets 6. A fastening tool is, for example, a bolt. That is, in this case, the front-rear frame 3 and the vehicle width frame 4 are bolted to each other through the brackets 6.

Specifically, the front-rear frame 3 includes first front-rear frames 31 having A-pillars 35 located on both right and left sides. The front-rear frame 3 may further have second front-rear frames 32 and third front-rear frames 33. Of the front-rear frame 3, the first front-rear frames 31 are located outermost in the vehicle width direction. The first front-rear frames 31 are located in a pair at the right and left. The first front-rear frame 31 extends substantially over the entirety of the vehicle 100 in the front-rear direction. A front portion of the first front-rear frame 31 is inclined with respect to the front-rear direction. The front portion of the first front-rear frame 31 functions as the A-pillar 35. A rear portion of the first front-rear frame 31 is inclined with respect to the front-rear direction. Both ends of the first front-rear frame 31 in the front-rear direction are detachably coupled to the vehicle body frame 1. In this example, the first front-rear frame 31 is configured such that a front frame located at the front and a rear frame located at the rear are coupled to each other.

Figure 3:
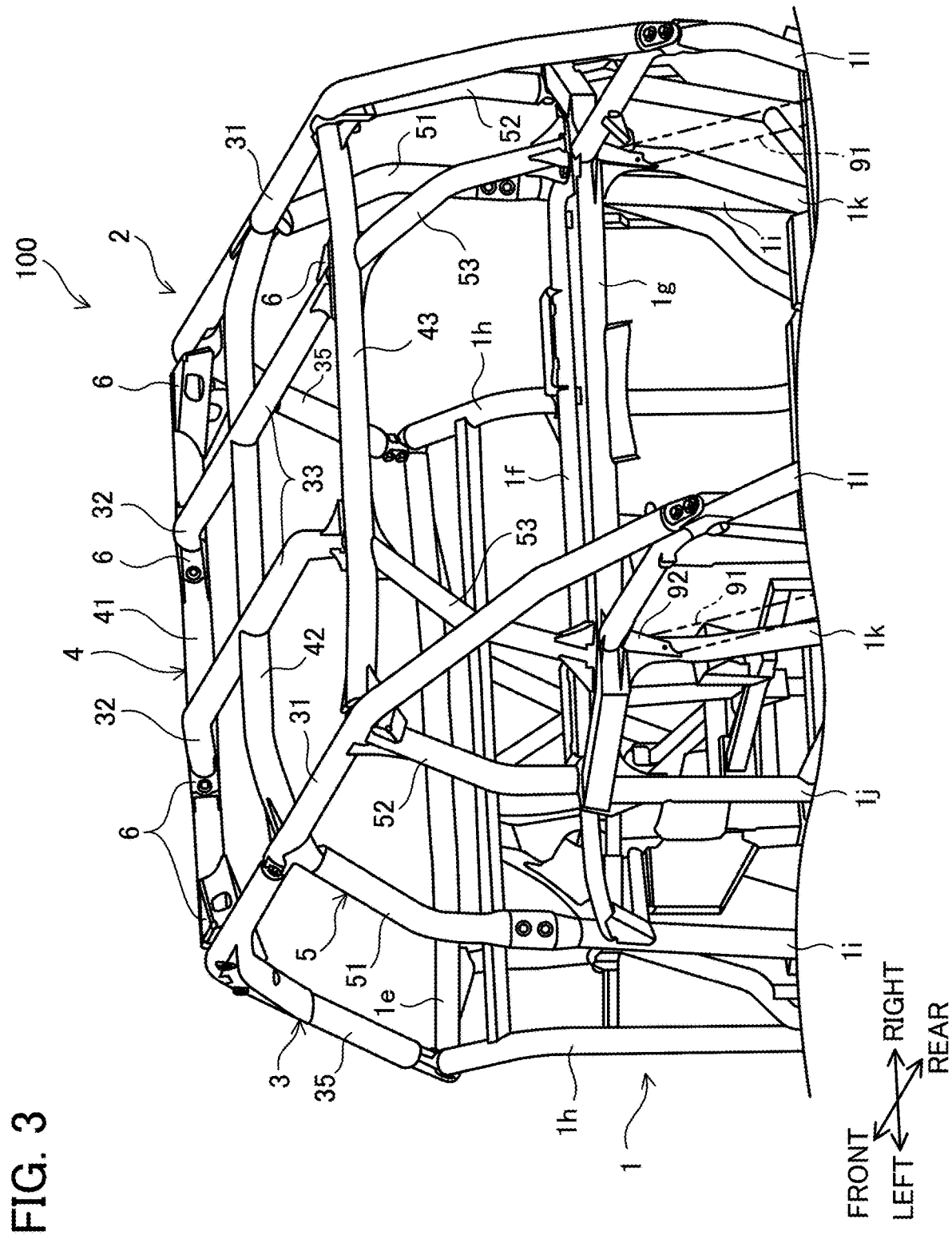
FIG. 3 is a perspective view of the vehicle body frame and the ROPS diagonally from the rear left.

FIG. 3 is a perspective view of the vehicle body frame 1 and the ROPS 2 diagonally from the rear left. The second front-rear frames 32 couple a first vehicle width frame 41 and a second vehicle width frame 42 to each other. The second front-rear frame 32 is coupled at least to the first vehicle width frame 41 through the bracket 6. The second front-rear frames 32 are located in a pair at the right and left. Specifically, the second front-rear frames 32 are located between the pair of right and left first front-rear frames 31. The pair of right and left second front-rear frames 32 is located substantially in parallel so as to extend substantially in the front-rear direction. The pair of right and left second front-rear frames 32 passes substantially above the driver seat and the rear seat.

The third front-rear frames 33 couple the second vehicle width frame 42 and a third vehicle width frame 43 to each other. The third front-rear frame 33 is coupled at least to the third vehicle width frame 43 through the bracket 6. The third front-rear frames 33 are located in a pair at the right and left. Specifically, the third front-rear frames 33 are located between the pair of right and left first front-rear frames 31. The pair of right and left third front-rear frames 33 is located substantially in parallel so as to extend substantially in the front-rear direction. The pair of right and left third front-rear frames 33 passes substantially above the rear seat. In this example, the second front-rear frame 32 and the third front-rear frame 33 are integrated.

The vehicle width frame 4 includes the first vehicle width frame 41, the second vehicle width frame 42 located at the rear with respect to the first vehicle width frame 41, and the third vehicle width frame 43 located at the rear with respect to the second vehicle width frame 42. In this example, the first vehicle width frame 41 is located at the front with respect to the center of the vehicle 100 in the front-rear direction. Specifically, the first vehicle width frame 41 passes substantially above an instrumental panel. The second vehicle width frame 42 is located substantially at the center of the vehicle 100 in the front-rear direction. Specifically, the second vehicle width frame 42 passes between the driver seat and the rear seat as viewed in the upper-lower direction. The third vehicle width frame 43 is located at the rear with respect to the center of the vehicle 100 in the front-rear direction. Specifically, the third vehicle width frame 43 passes above the rear seat. Note that both end portions of the third vehicle width frame 43 are inclined forward toward the outside in the vehicle width direction.

Each of the first vehicle width frame 41, the second vehicle width frame 42, and the third vehicle width frame 43 is coupled to the first front-rear frames 31 through the brackets 6. Specifically, both ends of the first vehicle width frame 41 are coupled, through the brackets 6, to front portions (specifically, upper ends of the A-pillars 35) of the right and left first front-rear frames 31 with respect to the center in the front-rear direction. Both ends of the second vehicle width frame 42 are coupled, through the brackets 6, to substantially center portions of the right and left first front-rear frames 31 in the front-rear direction. Both ends of the third vehicle width frame 43 are coupled, through the brackets 6, to rear portions of the right and left first front-rear frames 31 with respect to the center in the front-rear direction. Note that in this example, at a portion where the second front-rear frame 32 and the third front-rear frame 33 cross the second vehicle width frame 42, the second vehicle width frame 42 is fixed to the rear end (in other words, front end of the third front-rear frame 33) of the second front-rear frame 32 by, e.g., welding. The second vehicle width frame 42 may be coupled to the rear end of the second front-rear frame 32 through the bracket 6.

The upper-lower frame 5 couples a coupling portion between the front-rear frame 3 and the vehicle width frame 4 and the vehicle body frame 1 to each other. In this example, the upper-lower frame 5 includes first upper-lower frames 51, second upper-lower frames 52, and third upper-lower frames 53.

The first upper-lower frames 51 are located substantially at the center of the vehicle 100 in the front-rear direction. The first upper-lower frames 51 are located in a pair at the right and left. In this example, the first upper-lower frame 51 functions as a B-pillar. The first upper-lower frame 51 couples a coupling portion between the first front-rear frame 31 and the second vehicle width frame 42 and the upper end of the second vertical frame 1*i* to each other. Specifically, the upper end of the first upper-lower frame 51 is fixed to the coupling portion between the first front-rear frame 31 and the second vehicle width frame 42 by, e.g., welding. The lower end of the first upper-lower frame 51 is bolted to the upper end of the second vertical frame 1*i*, for example.

The second upper-lower frames 52 are located in a rear portion of the vehicle 100. The second upper-lower frames 52 are located in a pair at the right and left. In this example, the second upper-lower frame 52 functions as a C-pillar. The second upper-lower frame 52 couples a coupling portion between the first front-rear frame 31 and the third vehicle width frame 43 and the sixth cross frame 1*g* to each other. Specifically, the upper end of the second upper-lower frame 52 is fixed to the coupling portion between the first front-rear frame 31 and the third vehicle width frame 43 by, e.g., welding. The lower end of the second upper-lower frame 52 is bolted to the end of the sixth cross frame 1*g*, for example.

The third upper-lower frames 53 are located at the rear and inside in the vehicle width direction with respect to the second upper-lower frames 52. The third upper-lower frames 53 are located in a pair at the right and left. The third upper-lower frame 53 couples a coupling portion between the third front-rear frame 33 and the third vehicle width frame 43 and the sixth cross frame 1*g* to each other. Specifically, the upper end of the third upper-lower frame 53 is fixed to the coupling portion between the third front-rear frame 33 and the third vehicle width frame 43 by, e.g., welding. The lower end of the third upper-lower frame 53 is bolted to the sixth cross frame 1*g*, for example.

Specifically, the third upper-lower frames 53 couples a frame supporting the shock absorbers 91 in the vehicle body frame 1 and the vehicle width frame 4 to each other. Specifically, the third upper-lower frames 53 couples the sixth cross frame 1*g* which is the frame supporting the shock absorbers 91 in the vehicle body frame 1 and the third vehicle width frame 43 to each other. In this example, the third upper-lower frame 53 couples the third vehicle width frame 43 and a coupling portion between the sixth cross frame 1*g* and the shock absorber 91, i.e., a portion of the sixth cross frame 1*g* to which the coupling tool 92 is fixed, to each other.

In the vehicle 100 configured as described above, some frames of the vehicle body frame 1 and some frames of the ROPS 2 are connected in an annular shape. Specifically, the first cross frame 1*b* and the two second vertical frames 1*i* of the vehicle body frame 1 and the second vehicle width frame 42 and the two first upper-lower frames 51 of the ROPS 2 are connected in an annular shape as a whole. Moreover, the second cross frame 1*c* and the two third vertical frames 1*j* of the vehicle body frame 1 and the third vehicle width frame 43 and the two second upper-lower frames 52 of the ROPS 2 are connected in an annular shape as a whole. Further, the third cross frame 1*d* and the two fourth vertical frames 1*k* of the vehicle body frame 1 and the third vehicle width frame 43 and the two third upper-lower frames 53 of the ROPS 2 are connected in an annular shape as a whole. The first cross frame 1*b* and the two second vertical frames 1*i* are one example of a connection frame connecting the two first upper-lower frames 51 to each other. The second cross frame 1*c* and the two third vertical frames 1*j* are one example of a connection frame connecting the two second upper-lower frames 52 to each other. The third cross frame 1*d* and the two fourth vertical frames 1*k* are one example of a connection frame connecting the two third upper-lower frames 53 to each other.

Subsequently, the configuration of the coupling portion between the front-rear frame 3 and the vehicle width frame 4 in the ROPS 2 will be described in detail. In this example, there are two patterns of the configuration of the coupling portion. That is, a first pattern is a pattern in which the bracket 6 is fixed to one of the front-rear frame 3 or the vehicle width frame 4 at the coupling portion. A second pattern is a pattern in which the bracket 6 is fixed to each of the front-rear frame 3 and the vehicle width frame 4 at the coupling portion.

Figure 4:
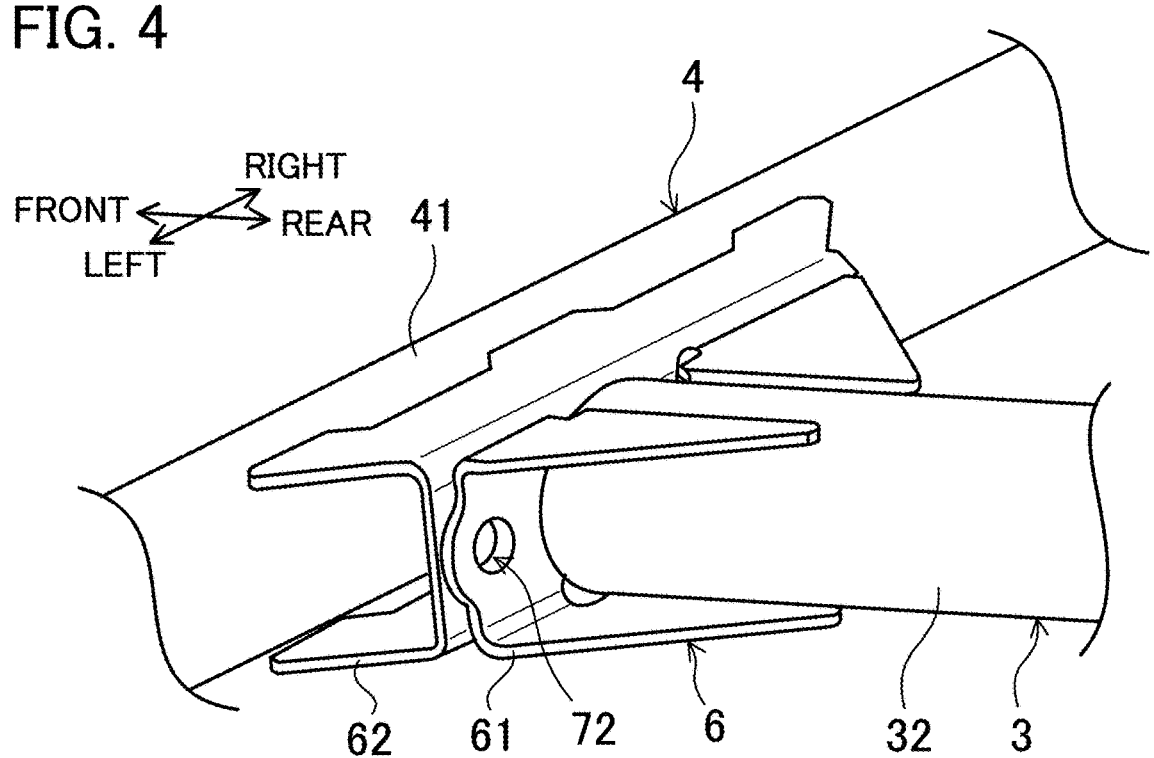
FIG. 4 is a perspective view of a frame coupling portion in the ROPS.

FIG. 4 is a perspective view of a portion A of FIG. 2 diagonally from above. The first vehicle width frame 41 is coupled to the second front-rear frame 32 through a first bracket 61 and a second bracket 62. Note that for the sake of convenience in description, the front-rear frame 3 and the vehicle width frame 4 are shown in a separated state and the fastening tool such as a bolt is not shown in FIG. 4. The same also applies to FIGS. 5 and 6 described later. The coupling configuration at the portion A is in the second pattern. Specifically, the first bracket 61 is fixed to the front end of the second front-rear frame 32 by, e.g., welding. The first bracket 61 has through-holes 72 penetrating the first bracket 61 in the thickness direction thereof. For example, bolts are inserted into the through-holes 72. The inner diameter of the through-hole 72 is greater than the outer diameter of the bolt. The second bracket 62 is fixed to the first vehicle width frame 41 by, e.g., welding. Welding nuts are fixed to the second bracket 62. The bolts inserted into the through-holes 72 are fastened to the welding nuts with the first bracket 61 and the second bracket 62 overlapping with each other. In this manner, the first vehicle width frame 41 is coupled to the second front-rear frame 32 through the first bracket 61 and the second bracket 62.

Figure 5:
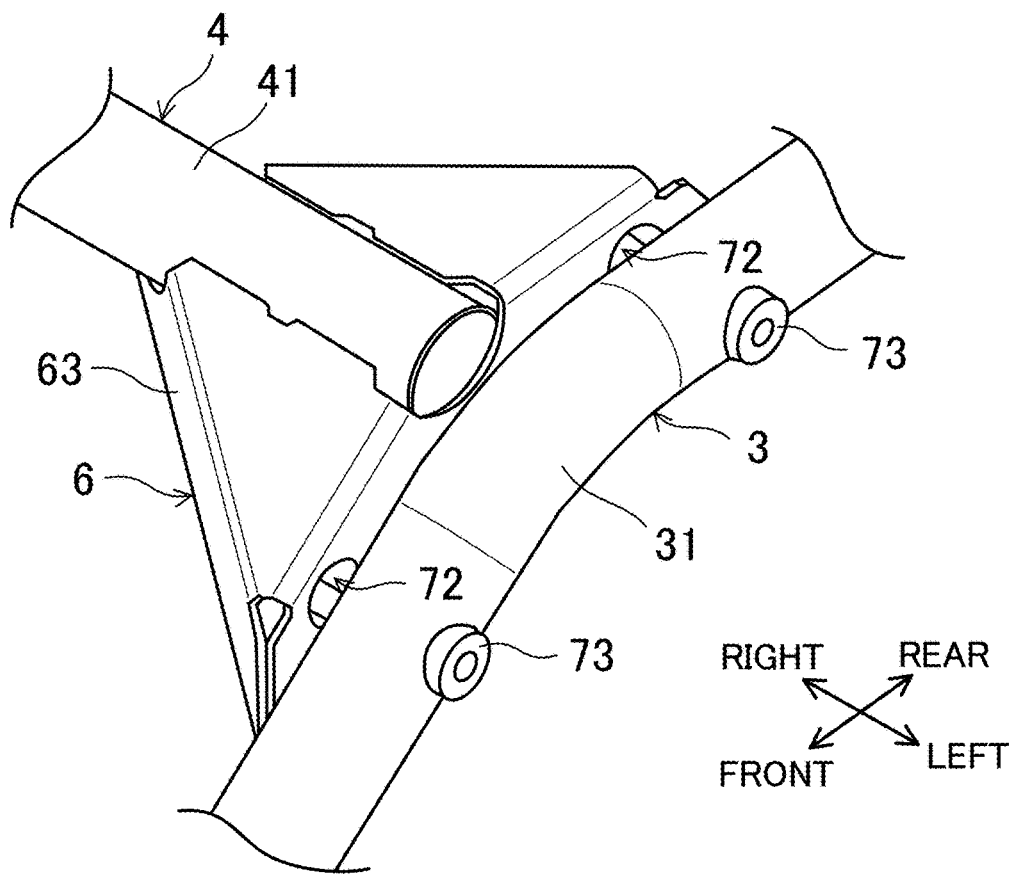
FIG. 5 is a perspective view of a frame coupling portion in the ROPS.

FIG. 5 is a perspective view of a portion B of FIG. 2 diagonally from above. The first vehicle width frame 41 is coupled to the first front-rear frame 31 through a third bracket 63. The coupling configuration at the portion B is in the first pattern. Specifically, the third bracket 63 is fixed to one end of the first vehicle width frame 41 by, e.g., welding. The third bracket 63 has through-holes 72 penetrating the third bracket 63. For example, bolts are inserted into the through-holes 72. The inner diameter of the through-hole 72 is greater than the outer diameter of the bolt. Welding nuts 73 are fixed to the first front-rear frame 31. The bolts inserted into the through-holes 72 are fastened to the welding nuts 73 with the third bracket 63 contacting the first front-rear frame 31. In this manner, the first vehicle width frame 41 is coupled to the first front-rear frame 31 through the third bracket 63.

Figure 6:
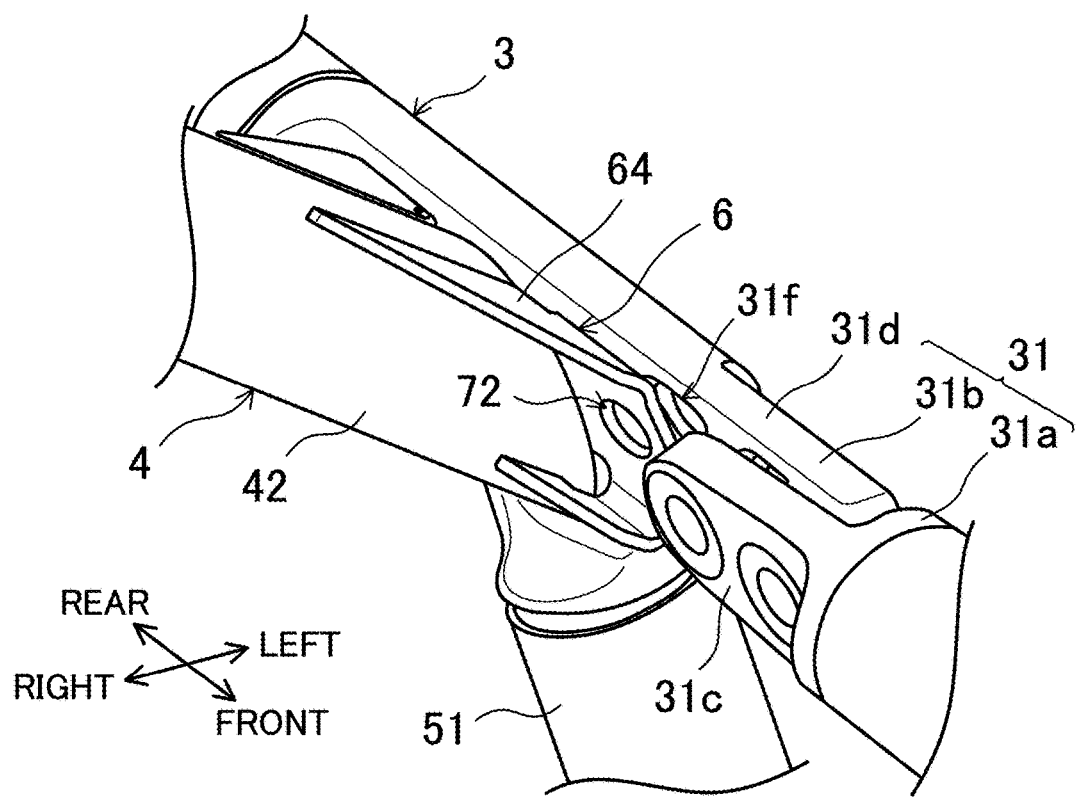
FIG. 6 is a perspective view of a frame coupling portion in the ROPS.

FIG. 6 is a perspective view of a portion C of FIG. 2 diagonally from above. The second vehicle width frame 42 is coupled to the first front-rear frame 31 through a fourth bracket 64. The coupling configuration at the portion C is in the first pattern. Specifically, the fourth bracket 64 is fixed to one end of the second vehicle width frame 42 by, e.g., welding. The fourth bracket 64 has a through-hole 72 penetrating the fourth bracket 64. For example, a bolt is inserted into the through-hole 72. The inner diameter of the through-hole 72 is greater than the outer diameter of the bolt. The first front-rear frame 31 has an attachment 31c and an attachment 31d coupling a front frame 31a and a rear frame 31b to each other. The attachment 31c is fixed to the rear end of the front frame 31a by, e.g., welding. The attachment 31d is fixed to the front end of the rear frame 31b by, e.g., welding. Each of the attachment 31c and the attachment 31d is a casted member. The attachment 31c and the attachment 31d are bolted to each other, and in this manner, the front frame 31a and the rear frame 31b are coupled to each other. The attachment 31d is further fixed to the upper end of the first upper-lower frame 51 by, e.g., welding. The attachment 31d includes an internal thread 31f into which the bolt is screwed. The bolt inserted into the through-hole 72 is fastened to the internal thread 31f of the attachment 31d with the fourth bracket 64 contacting the first front-rear frame 31, specifically the attachment 31d. In this manner, the second vehicle width frame 42 is coupled to the first front-rear frame 31 through the fourth bracket 64.

Figure 7:
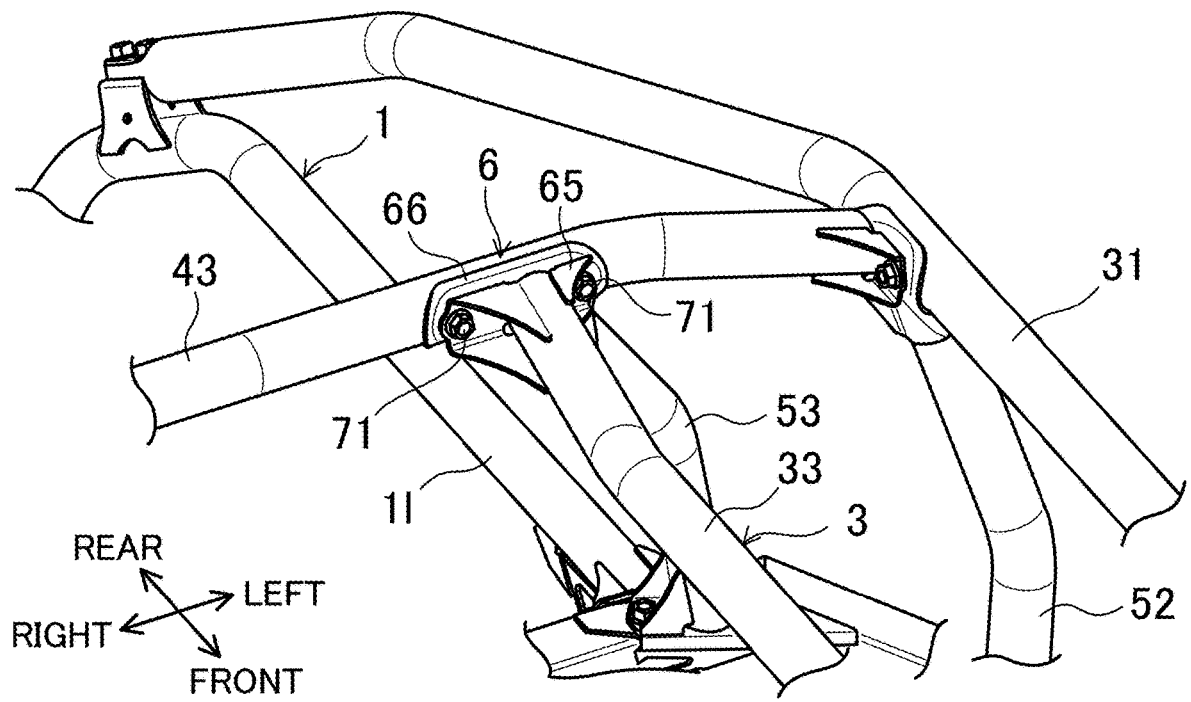
FIG. 7 is a perspective view of a frame coupling portion in the ROPS.
Figure 8:
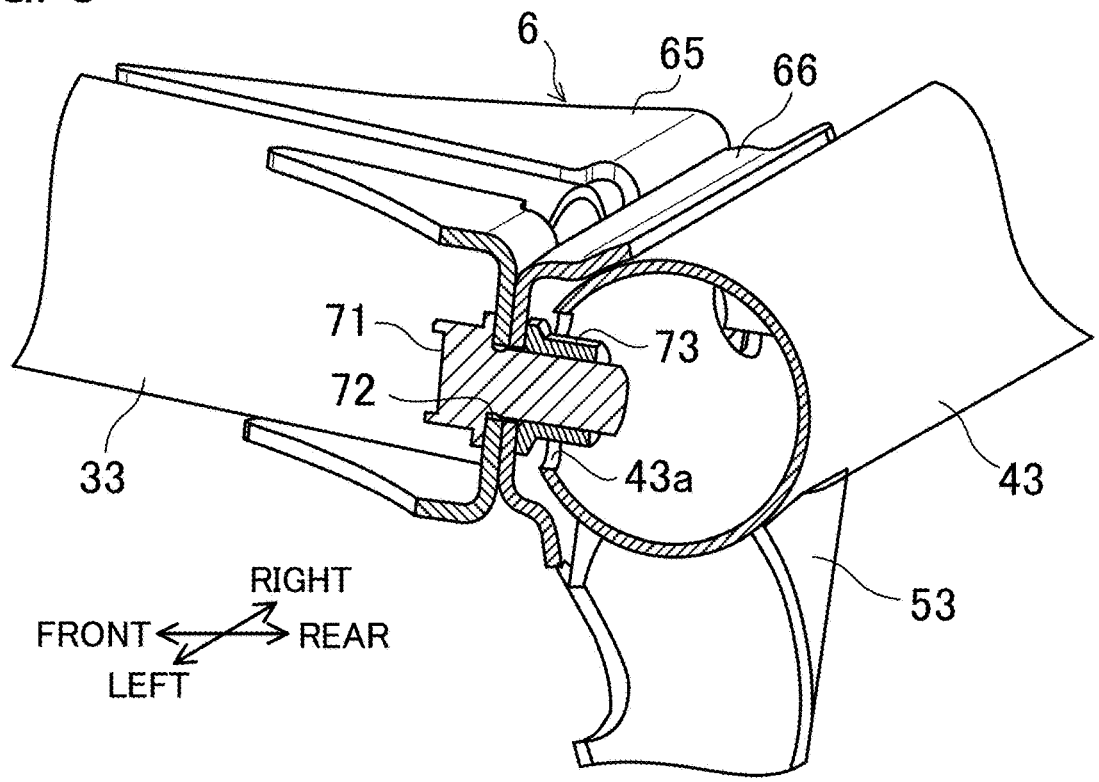
FIG. 8 is a sectional view of the frame coupling portion in the ROPS.
Figure 9:
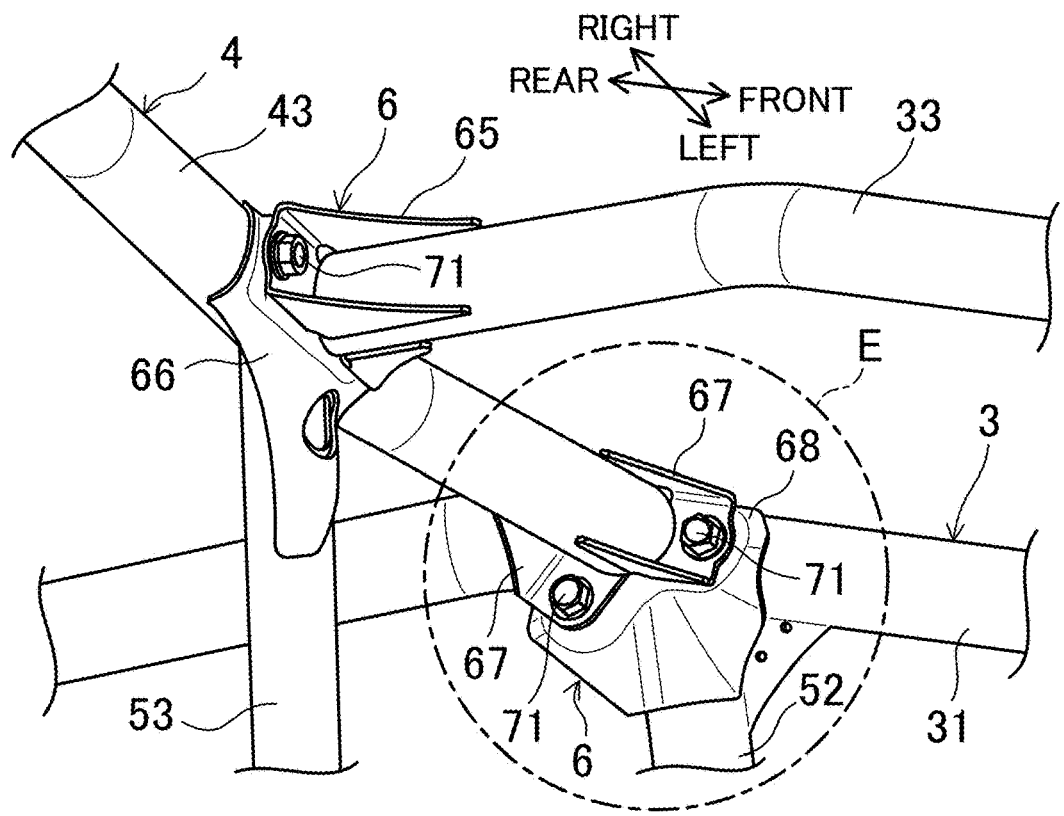
FIG. 9 is a perspective view of a frame coupling portion in the ROPS.

FIG. 7 is a perspective view of a portion D of FIG. 2 diagonally from above. FIG. 8 is a sectional view of a coupling portion along a plane including the centers of bolts 71 located at the portion D and extending perpendicularly to the vehicle width direction. FIG. 9 is a perspective view of a portion E of FIG. 2 and the periphery thereof diagonally from below. The third vehicle width frame 43 is coupled to the third front-rear frame 33 through a fifth bracket 65 and a sixth bracket 66. The coupling configuration at the portion D is in the second pattern. Specifically, the fifth bracket 65 is fixed to the rear end of the third front-rear frame 33 by, e.g., welding. The fifth bracket 65 has through-holes 72 penetrating the fifth bracket 65 in the thickness direction thereof. For example, the bolts 71 are inserted into the through-holes 72. The inner diameter of the through-hole 72 is greater than the outer diameter of the bolt 71. The sixth bracket 66 is fixed to the third vehicle width frame 43 by, e.g., welding. More specifically, the sixth bracket 66 is located at a portion of the third vehicle width frame 43 coupled to the third upper-lower frame 53. The sixth bracket 66 is fixed over a portion from the third vehicle width frame 43 to the third upper-lower frame 53. Welding nuts 73 are fixed to the sixth bracket 66. Note that the third vehicle width frame 43 includes through-holes 43a in order to avoid contact with the welding nuts 73. The bolts 71 inserted into the through-holes 72 are fastened to the welding nuts 73 with the fifth bracket 65 and the sixth bracket 66 overlapping with each other. In this manner, the third vehicle width frame 43 is coupled to the third front-rear frame 33 through the fifth bracket 65 and the sixth bracket 66.

As shown in FIG. 9, the third vehicle width frame 43 is coupled to the first front-rear frame 31 through a seventh bracket 67 and an eighth bracket 68. The coupling configuration at the portion E is in the second pattern. Specifically, the seventh bracket 67 is fixed to one end of the third vehicle width frame 43 by, e.g., welding. The seventh bracket 67 has through-holes penetrating the seventh bracket 67 in the thickness direction thereof. For example, bolts 71 are inserted into the through-holes. The inner diameter of the through-hole is greater than the outer diameter of the bolt 71. The eighth bracket 68 is fixed to the first front-rear frames 31 by, e.g., welding. More specifically, the eighth bracket 68 is located at a portion of the first front-rear frame 31 coupled to the second upper-lower frame 52. The eighth bracket 68 is fixed over a portion from the first front-rear frame 31 to the second upper-lower frame 52. Welding nuts are fixed to the eighth bracket 68. The bolts 71 inserted into the through-holes are fastened to the welding nuts with the seventh bracket 67 and the eighth bracket 68 overlapping with each other. In this manner, the third vehicle width frame 43 is coupled to the first front-rear frame 31 through the seventh bracket 67 and the eighth bracket 68.

In the vehicle 100 configured as described above, the front-rear frame 3 and the vehicle width frame 4 are coupled to each other through the brackets 6. With this configuration, the stiffness of the ROPS 2 can be enhanced. Specifically, for example, in a case where the front-rear frame 3 and the vehicle width frame 4 are bolted to each other through the first bracket 61 etc., there is a clearance between the bolt 71, specifically a shaft portion of the bolt 71, and the through-hole 72 of, e.g., the first bracket 61. Even in a case where a dimension error in each frame of the ROPS 2 and a position error upon assembly of the ROPS 2 are caused, the clearance between the bolt 71 and the through-hole 72 can absorb such errors. Thus, distortion of the entire ROPS 2 can be reduced. Since the distortion of the entire ROPS 2 is reduced, the stiffness of the ROPS 2 can be enhanced.

In a case where the frames of the ROPS 2 are coupled to each other by, e.g., welding, there is a probability that each frame cannot be located at a proper position due to, e.g., the dimension error in each frame and a position error upon welding. For example, a load transmitted in each frame can be easily dispersed in such a manner that three or more frames are joined and coupled to each other at one coupling portion. However, if the dimension error and the position error are accumulated, it may be difficult to couple the frames at one coupling portion. The first bracket 61 etc. absorb the dimension error and the position error so that error accumulation can be reduced and each frame can be easily located at a desired position. Thus, the ROPS 2 can easily disperse force, and can effectively receive impact from the outside. As a result, the stiffness of the ROPS 2 can be enhanced.

Specifically, some frames of the vehicle body frame 1 and some frames of the ROPS 2 are connected in the annular shape in the vehicle 100. With this configuration, the stiffnesses of the vehicle body frame 1 and the ROPS 2 are improved. In order to achieve such an annular structure, each frame needs to be joined at a proper position. The frames are bolted to each other through the first bracket 61 etc. as described above so that error accumulation can be reduced and each frame can be located at a desired position. As a result, the annular frame structure can be easily achieved, and the stiffnesses of the vehicle body frame 1 and the ROPS 2 can be improved. Specifically, the second vehicle width frame 42, the pair of right and left first upper-lower frames 51, the pair of right and left second vertical frames 1i, and the first cross frame 1b are connected in the annular shape. The third vehicle width frame 43, the pair of right and left second upper-lower frames 52, the pair of right and left third vertical frames 1j, and the second cross frame 1c are connected in the annular shape. The third vehicle width frame 43, the pair of right and left third upper-lower frames 53, the pair of right and left fourth vertical frames 1k, and the third cross frame 1d are connected in the annular shape. It follows that in this example, all the first upper-lower frames 51, the second upper-lower frames 52, and the third upper-lower frames 53 of the upper-lower frame 5 contribute to the above-described annular structure.

The front-rear frame 3 includes the first front-rear frames 31 having the A-pillars 35 located on both right and left sides. With this configuration, the stiffness of the ROPS 2 having the A-pillars 35 can be enhanced. Each of the first vehicle width frame 41, the second vehicle width frame 42, and the third vehicle width frame 43 is coupled to the first front-rear frames 31 through the brackets 6. That is, the portions of the first front-rear frames 31 are coupled to all the first vehicle width frame 41, the second vehicle width frame 42, and the third vehicle width frame 43 through the brackets 6. Thus, the stiffness of the ROPS 2 can be further enhanced.

The front-rear frame 3 has the second front-rear frames 32 and the third front-rear frames 33 so that an occupant can be more effectively protected, for example, even when the vehicle 100 rolls over. Moreover, the second front-rear frame 32 is coupled at least to the first vehicle width frame 41 through the bracket 6 so that the distortion of the entire ROPS 2 can be reduced and the stiffness of the ROPS 2 can be enhanced even in a case where the second front-rear frames 32 are included. Similarly, the third front-rear frame 33 is coupled at least to the third vehicle width frame 43 through the bracket 6 so that the distortion of the entire ROPS 2 can be reduced and the stiffness of the ROPS 2 can be enhanced even in a case where the third front-rear frames 33 are included.

The upper-lower frame 5 couples the coupling portion between the front-rear frame 3 and the vehicle width frame 4 and the vehicle body frame 1 to each other. With this configuration, the ROPS 2 can more easily disperse force, and can more effectively receive impact from the outside. As a result, the stiffness of the ROPS 2 can be further enhanced. The third upper-lower frames 53 couples the sixth cross frame 1g supporting the shock absorbers 91 in the vehicle body frame 1 and the third vehicle width frame 43 to each other. With this configuration, impact on the ROPS 2 from the outside can be damped by the shock absorbers 91. As a result, the stiffness of the ROPS 2 can be further enhanced. Particularly, in this example, the third upper-lower frame 53 couples the third vehicle width frame 43 and the portion of the sixth cross frame 1g coupled to the shock absorber 91 to each other. With this configuration, the shock absorber 91 can effectively damp impact from the outside as compared to a case where the third upper-lower frame 53 couples a portion apart from the portion of the sixth cross frame 1g coupled to the shock absorber 91.

The front-rear frame 3 and the vehicle width frame 4 are coupled to each other in the first pattern or the second pattern. That is, in the first pattern, the bracket 6 is fixed to one of the front-rear frame 3 or the vehicle width frame 4 at the coupling portion between the front-rear frame 3 and the vehicle width frame 4. With this configuration, the configuration of the coupling portion can be simplified. In the second pattern, the bracket 6 is fixed to each of the front-rear frame 3 and the vehicle width frame 4 at the coupling portion between the front-rear frame 3 and the vehicle width frame 4. With this configuration, the strengths of the front-rear frame 3 and the vehicle width frame 4 at the coupling portion can be greater than those in the first pattern.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The shape of the vehicle body frame 1 is not limited. The shape of the ROPS 2 is not also limited as long as the front-rear frame 3, the vehicle width frame 4, and the brackets 6 are included. For example, the ROPS 2 does not necessarily include the right and left pairs of second front-rear frame 32 and third front-rear frame 33, the pair of right and left first upper-lower frames 51, the pair of right and left second upper-lower frames 52, and the pair of right and left third upper-lower frames 53, and may be in such a shape that the first vehicle width frame 41, the second vehicle width frame 42, and the third vehicle width frame 43 are coupled to the pair of right and left first front-rear frames 31.

The number of front-rear frames 3 and the number of vehicle width frames 4 are not limited. In the above-described example, the number of front-rear frames 3 is four (i.e., the pair of right and left first front-rear frames 31 and the right and left pairs of second front-rear frame 32 and third front-rear frame 33), but may be one, two, three, or five or more. In the above-described example, the number of vehicle width frames 4 is three (i.e., the first vehicle width frame 41, the second vehicle width frame 42, and the third vehicle width frame 43), but may be one, two, or four or more.

The front-rear frame 3 and the vehicle width frame 4 are only required to be coupled to each other through the bracket 6 at least at one coupling portion among the coupling portions between the front-rear frame 3 and the vehicle width frame 4. At all the coupling portions between the front-rear frame 3 and the vehicle width frame 4, the front-rear frame 3 and the vehicle width frame 4 may be coupled to each other through the brackets 6. The shape of the bracket 6 and the number of brackets 6 are not limited. The configuration of the coupling portion between the front-rear frame 3 and the vehicle width frame 4 through the bracket 6 is not limited. In the above-described example, the configuration of the coupling portion through the bracket 6 includes the first pattern and the second pattern, but may include only the first pattern or the second pattern or include another pattern other than the first pattern and the second pattern.

The front-rear frame 3 does not necessarily include the A-pillars 35. The second front-rear frames 32 are not necessarily coupled to the first vehicle width frame 41 through the brackets 6. For example, the front end of the second front-rear frame 32 may be welded to the first vehicle width frame 41. Similarly, the third front-rear frames 33 are not necessarily coupled to the third vehicle width frame 43 through the brackets 6. For example, the rear end of the third front-rear frame 33 may be welded to the third vehicle width frame 43.

The upper-lower frame 5 does not necessarily couple the coupling portion between the front-rear frame 3 and the vehicle width frame 4 and the vehicle body frame 1 to each other. For example, the upper-lower frame 5 may couple a portion of the front-rear frame 3 or the vehicle width frame 4 apart from the coupling portion between the front-rear frame 3 and the vehicle width frame 4 to the vehicle body frame 1. The third upper-lower frames 53 do not necessarily couple the sixth cross frame 1g supporting the shock absorbers 91 in the vehicle body frame 1 and the third vehicle width frame 43 to each other. For example, the third upper-lower frame 53 may couple the third vehicle width frame 43 and the fifth vertical frames 1l to each other.

The second vehicle width frame 42, the pair of right and left first upper-lower frames 51, the pair of right and left second vertical frames 1i, and the first cross frame 1b are not necessarily connected in the annular shape. The third vehicle width frame 43, the pair of right and left second upper-lower frames 52, the pair of right and left second vertical frames 1i, and the second cross frame 1c are not necessarily connected in the annular shape. The third vehicle width frame 43, the pair of right and left third upper-lower frames 53, the pair of right and left fourth vertical frames 1k, and the third cross frame 1d are not necessarily connected in the annular shape.

The technique of the present disclosure as described above will be summarized as follows.

[1] The utility vehicle 100 (off-road vehicle) includes the vehicle body frame 1 and the ROPS 2 coupled to the vehicle body frame 1. The ROPS 2 has the front-rear frame 3 extending substantially in the front-rear direction, the vehicle width frame 4 extending substantially in the vehicle width direction, and the brackets 6 coupling the front-rear frame 3 and the vehicle width frame 4 to each other.

According to this configuration, the front-rear frame 3 and the vehicle width frame 4 are coupled to each other through the brackets 6. Thus, even in a case where the dimension error in the front-rear frame 3 and the vehicle width frame 4 and the position error upon assembly of the ROPS 2 are caused, the brackets 6 can absorb such errors. Thus, the distortion of the entire ROPS 2 can be reduced. Since the distortion of the entire ROPS 2 is reduced, the stiffness of the ROPS 2 can be enhanced.

[2] In the utility vehicle 100 of [1], the front-rear frame 3 includes the first front-rear frames 31 having the A-pillars 35 located on both right and left sides.

According to this configuration, the stiffness of the ROPS 2 having the A-pillars 35 can be enhanced.

[3] In the utility vehicle 100 of [1] or [2], the vehicle width frame 4 includes the first vehicle width frame 41 and the second vehicle width frame 42 located at the rear with respect to the first vehicle width frame 41, the front-rear frame 3 includes the second front-rear frames 32 coupling the first vehicle width frame 41 and the second vehicle width frame 42 to each other, and the second front-rear frames 32 are coupled at least to the first vehicle width frame 41 through the brackets 6.

According to this configuration, the second front-rear frames 32 can more effectively protect an occupant, for example, even when the vehicle 100 rolls over. Moreover, the second front-rear frames 32 are coupled at least to the first vehicle width frame 41 through the brackets 6 so that the distortion of the entire ROPS 2 can be reduced and the stiffness of the ROPS 2 can be enhanced even in a case where the second front-rear frames 32 are included.

[4] In the utility vehicle 100 of any one of [1] to [3], the front-rear frame 3 includes the first front-rear frames 31 having the A-pillars 35 located on both right and left sides, the vehicle width frame 4 includes the first vehicle width frame 41, the second vehicle width frame 42 located at the rear with respect to the first vehicle width frame 41, and the third vehicle width frame 43 located at the rear with respect to the second vehicle width frame 42, and each of the first vehicle width frame 41, the second vehicle width frame 42, and the third vehicle width frame 43 is coupled to the first front-rear frames 31 through the brackets 6.

According to this configuration, each of the first vehicle width frame 41, the second vehicle width frame 42, and the third vehicle width frame 43 is coupled to the first front-rear frames 31 through the brackets 6. Thus, the stiffness of the ROPS 2 can be further enhanced.

[5] In the utility vehicle 100 of any one of [1] to [4], the ROPS 2 further has the upper-lower frame 5 extending substantially in the upper-lower direction, and the upper-lower frame 5 couples the coupling portion between the front-rear frame 3 and the vehicle width frame 4 and the vehicle body frame 1 to each other.

According to this configuration, the ROPS 2 can easily disperse force, and can effectively receive impact from the outside. As a result, the stiffness of the ROPS 2 can be further enhanced.

[6] In the utility vehicle 100 of any one of [1] to [5], the ROPS 2 further has the two upper-lower frames 5 extending substantially in the upper-lower direction, the vehicle body frame 1 has the connection frame coupling the two upper-lower frames 5 to each other, and the vehicle width frame 4, the two upper-lower frames 5, and the connection fame are connected in the annular shape.

According to this configuration, the frames connected in the annular shape can effectively receive impact from the outside. As a result, the stiffnesses of the vehicle body frame 1 and the ROPS 2 are improved.

[7] In the utility vehicle 100 of any one of [1] to [6], the ROPS 2 further has the upper-lower frame 5 extending substantially in the upper-lower direction, and the upper-lower frame 5 couples the frame (i.e., sixth cross frame 1g) supporting the shock absorbers 91 in the vehicle body frame 1 and the third vehicle width frame 43 to each other.

According to this configuration, the shock absorbers 91 can damp impact from the outside. As a result, the stiffness of the ROPS 2 can be further enhanced.

What is claimed:

1. An off-road vehicle comprising:
   a vehicle body frame; and
   a ROPS coupled to the vehicle body frame,
   wherein the ROPS has a front-rear frame extending substantially in a front-rear direction, a vehicle width frame extending substantially in a vehicle width direction, and a bracket coupling the front-rear frame and the vehicle width frame to each other,
   wherein the front-rear frame includes a pair of first front-rear frames having A-pillars located on both right and left sides, and
   wherein the bracket covers a bent portion of one of the A-pillars from an inside in the vehicle width direction and covers a lower part of the vehicle width frame, and is fixed to the front-rear frame at a position forward of the bent portion and at a position behind the bent portion.

2. The off-road vehicle of claim 1, wherein
   the vehicle width frame includes a first vehicle width frame and a second vehicle width frame located at a rear with respect to the first vehicle width frame,
   the front-rear frame includes a second front-rear frame coupling the first vehicle width frame and the second vehicle width frame to each other, the second front-rear frame being located between the pair of first front-rear frames, and
   the second front-rear frame is coupled at least to the first vehicle width frame through an additional bracket fixed to the second front-rear frame.

3. The off-road vehicle of claim 1, wherein
   the vehicle width frame includes a first vehicle width frame, a second vehicle width frame located at a rear with respect to the first vehicle width frame, and a third vehicle width frame located at the rear with respect to the second vehicle width frame,
   the bracket includes separate brackets, and
   each of the first vehicle width frame, the second vehicle width frame, and the third vehicle width frame is coupled to the pair of first front-rear frames through the separate brackets.

4. The off-road vehicle of claim 1, wherein
   the ROPS further has an upper-lower frame extending substantially in an upper-lower direction, and
   the upper-lower frame couples a coupling portion between the front-rear frame and the vehicle width frame to the vehicle body frame.

5. The off-road vehicle of claim 1, wherein
   the ROPS further has two upper-lower frames extending substantially in an upper-lower direction,
   the vehicle body frame has a connection frame coupling the two upper-lower frames to each other, and
   the vehicle width frame, the two upper-lower frames, and the connection frame are connected in an annular shape.

6. The off-road vehicle of claim 1, wherein
   the bracket includes a first bracket and a second bracket,
   the first bracket is fixed to the front-rear frame, and
   the second bracket is fixed to the vehicle width frame.

7. The off-road vehicle of claim 1, wherein the bracket is fixed to the front-rear frame by bolts that pass through the front-rear frame in the vehicle width direction.

8. An off-road vehicle comprising:
   a vehicle body frame; and
   a ROPS coupled to the vehicle body frame,
   wherein the ROPS has a front-rear frame extending substantially in a front-rear direction, a vehicle width frame extending substantially in a vehicle width direction, a bracket coupling the front-rear frame and the vehicle width frame to each other, and an upper-lower frame extending substantially in an upper-lower direction, and
   the upper-lower frame couples a frame supporting a shock absorber in the vehicle body frame and the vehicle width frame to each other.

9. An off-road vehicle comprising:
   a vehicle body frame; and
   a ROPS coupled to the vehicle body frame, wherein
   the ROPS has a front-rear frame extending substantially in a front-rear direction, a vehicle width frame extending substantially in a vehicle width direction, and a bracket coupling the front-rear frame and the vehicle width frame to each other,
   the vehicle width frame includes a first vehicle width frame and a second vehicle width frame located at a rear with respect to the first vehicle width frame,
   the front-rear frame includes a pair of first front-rear frames having A-pillars located on both right and left sides and a second front-rear frame coupling the first vehicle width frame and the second vehicle width frame to each other and that is located between the pair of first front-rear frames,
   the bracket covers a bent portion of one of the A-pillars from an inside in the vehicle width direction and covers a lower part of the vehicle width frame, and is fixed to the front-rear frame at a position forward of the bent portion and at a position behind the bent portion, and
   the second front-rear frame is coupled at least to the first vehicle width frame through a second bracket.

* * * * *